Feb. 11, 1958 G. R. SUTHERLAND 2,822,655
PLATFORM ADJUSTING MEANS FOR AN AGRICULTURAL MACHINE
Filed May 20, 1954 2 Sheets-Sheet 1
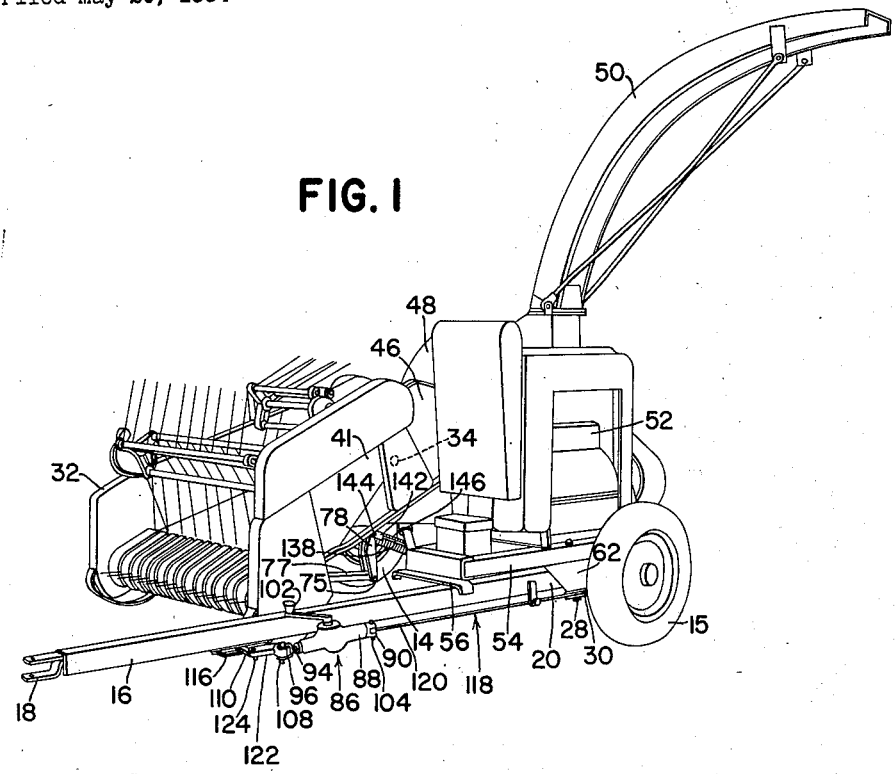
INVENTOR.
GAIL R. SUTHERLAND Feb. 11, 1958 G. R. SUTHERLAND 2,822,655
PLATFORM AJUSTING MEANS FOR AN AGRICULTURAL MACHINE
Filed May 20, 1954 2 Sheets-Sheet 2
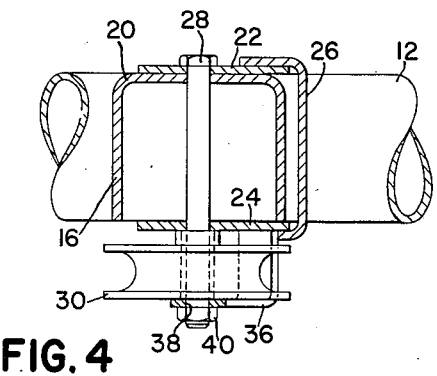
FIG. 4
FIG. 3
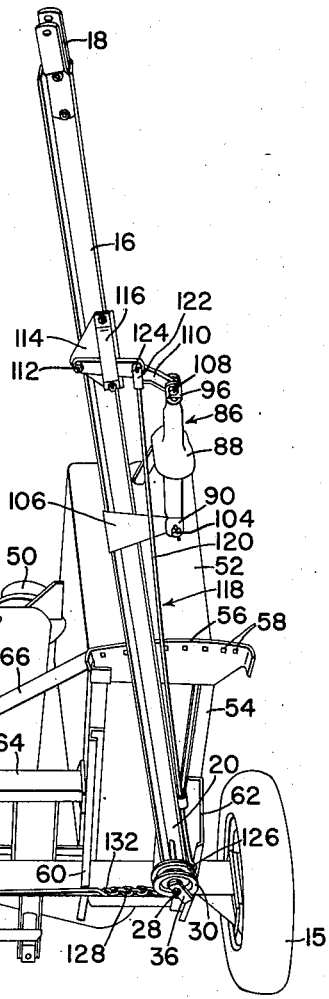
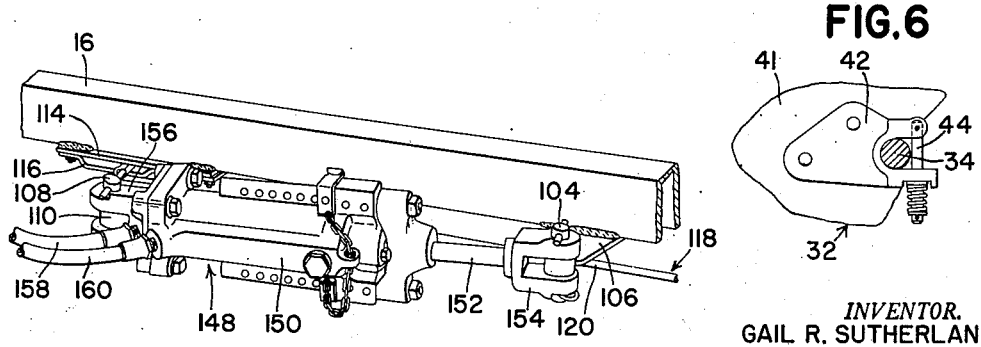
FIG. 5 FIG. 6
INVENTOR.
GAIL R. SUTHERLAND United States Patent Office 2,822,655
Patented Feb. 11, 1958

2,822,655

PLATFORM ADJUSTING MEANS FOR AN AGRICULTURAL MACHINE

Gail R. Sutherland, Ottumwa, Iowa, assignor to Deere Manufacturing Co., Dubuque, Iowa, a corporation of Iowa Application May 20, 1954, Serial No. 431,142

13 Claims. (Cl. 56—208)

This invention relates to an agricultural machine and more particularly to means for adjusting the working part of the machine.

A typical machine of the character generally referred to will comprise a mobile main frame having a frame part or draft tongue for connection to a draft or propelling vehicle. In addition, the mobile main frame will carry an adjustable agricultural working part, the adjustment of which is preferably accomplished by means having an initiating control member relatively close to the operator on the draft vehicle so that the adjustment may be conveniently made. Although control and adjusting means of the broad character specified are old and well known, most of these suffer from major design defects that render them inefficient in operation, expensive to manufacture and maintain and ungainly in appearance.

According to the present invention, the improved control and adjusting means is carried by the draft tongue to extend therealong and has a transverse force-transmitting element running to adjusting means on the main frame for the working part. It is a primary object of the invention to utilize a flexible force-transmitting element trained about a pair of sheaves, one of which is spaced fore-and-aft from the force-exerting means on the tongue and the other of which is adjacent to the adjusting means for the working part. The entire force-exerting means, force-transmitting element and sheave arrangement is confined largely to a horizontal zone and therefore has no upwardly projecting parts to interfere with crops on which the machine is operating or to detract from the over-all appearance of the machine. Other objects of the invention include the use of direction-changing means for changing the direction of movement of the force-transmitting element; to mount the direction-changing means at or in coaxial alinement with a pivot point about which the draft tongue is adjustable; and to provide for the interchangeable use of various types of force-transmitting means or devices.

The foregoing and other important objects and desirable features inherent in and encompassed by the invention will become apparent as a preferred embodiment of the invention is disclosed in detail in the following description and accompanying sheets of drawings, the several figures of which will be described immediately below.

Fig. 1 is a perspective view of a representative type of agricultural machine in which the design of the invention is embodied.

Fig. 2 is a longitudinal sectional view through one form of force-transmitting means or device, the scale of the drawing being considerably enlarged over that of Fig. 1.

Fig. 3 is a perspective view showing the machine, from which the harvester part has been removed, tipped upwardly so that the bottom thereof is visible.

Fig. 4 is an enlarged fragmentary sectional view showing the combined mounting of the draft tongue and one of the shafts.

Fig. 5 is a perspective view, on a scale somewhat enlarged over that of Figs. 1 and 3, showing the use of a fluid-powered force-transmitting means.

Fig. 6 is a fragmentary view, partly in section and drawn to an enlarged scale, showing a representative pivot for mounting of the working part on the main frame for vertical adjustment.

The agricultural machine chosen for purposes of illustration is of the type known as a forage harvester having a pickup attachment thereon. The machine comprises generally a main frame 10 including a transverse part in the form of an axle 12 on which right- and left-hand wheels 14 and 15 are journaled. Reference here and elsewhere in this description to "right" and "left" is with reference to the parts of the machine as seen by an observer standing behind the machine and looking forwardly.

The main frame further includes a first frame part in the form of a draft tongue 16 having at its front or forward end a clevis 18 by means of which the tongue may be connected to a tractor or equivalent draft vehicle. The tongue 16 has a rear end or end portion 20 which is secured or connected to the main frame 10 by means best shown in Fig. 4. As illustrated in this figure, the left-hand portion of the tubular axle 12 has thereon a bracket including upper and lower plates 22 and 24, which are rigidly secured to the axle, as by welding, and which are vertically spaced and interbraced by a fore-and-aft extending channel portion 26. The plates 22 and 24, as well as the rear portion 20 of the tongue 16, are apertured in vertical alinement to receive an upright pivot member or bolt 28 which forms pivot means on an upright or vertical pivot axis for mounting of the frame part or tongue 16 for lateral adjustment relative to the main frame 10. Also as seen in Fig. 4, the pivot bolt or pin 28 is elongated beyond the extent necessary for pivotal mounting of the tongue 16 and is so designed for the purpose of presenting a journal axis for journaling a sheave 30 which, as will hereinafter appear in greater detail, constitutes a first guide means or direction-changing means for operation in conjunction with means for adjusting a second frame part in the form of an agricultural working part or pickup attachment 32 that is mounted on the main frame 10 for vertical adjustment relative to the main frame about a transverse horizontal axis established by a transverse shaft 34 included in the main frame.

The means for mounting the sheave 30 includes, in addition to the structure just described, a depending angled bracket portion 36 apertured at 38 to receive the lower end of the bolt 28. A nut 40 is threaded onto the lower end of the bolt and completes the structure.

The working part or pickup attachment 32 may be of any conventional construction, as in the U. S. Patent to Hill 2,493,918, and a description of the details thereof is deemed unnecessary to the present disclosure. Suffice it to say that the part 32 has a rear portion 41 on which is mounted a bifurcated bracket 42 receivable by the transverse pivot shaft 34 (Fig. 6). A spring-loaded locking pin 44 maintains the pivotal connection and permits easy removal of the pickup attachment 32. The arrangement of Fig. 6 is duplicated at the opposite end of the shaft 34, but the duplicated structure is not illustrated. In this respect, it should be noted that in Fig. 3 the attachment 32 has been removed to clearly expose the under portion of the main frame 10 and its associated parts other than the attachment 32. As is generally conventional, the pickup attachment 32 operates to pick up crops from the field and to transfer them rearwardly to a feed housing 46 from which the crops are moved into a rotor housing 48 for ultimate delivery by an upwardly and laterally curving discharge spout 50. As already mentioned, the machine is merely representative of many machines on which the present invention could be used.

Power for operating the mechanism in the rotor housing, feed housing and pickup attachment is here furnished by an internal combustion engine 52 carried on a subframe 54 that forms part of the main frame 10; although, the machine could as well be equipped with means deriving power from the power take-off of the tractor (not shown). Again, the details are immaterial and are described merely because they are illustrated as part of the basic structure. The forward portion of the subframe 54 comprises a transverse member 56 in which is provided a plurality of apertures 58, any one of which may be used to receive a locking pin (not shown) to fix any selected lateral adjustment of the tongue 16, which adjustment is accomplished about the pivot axis established by the pivot bolt 28. The subframe 54 is tied into the plate structure 22 and 24 and axle 12 by fore-and-aft extending members 60 and 62, each of which is of channel section and the latter of which includes as a continuation thereof the aforementioned interbracing channel portion 26. The subframe 54 is additionally braced to the feed house 46 by a transverse frame member 64 and a diagonal frame member 66.

Because of the mounting of the pickup attachment 32 on the main frame by means of the pivot structure of Fig. 6, the pickup attachment or agricultural working part is capable of vertical adjustment relative to the main frame, and for this reason some form of control means must be provided for accomplishing the adjustment. It is preferred that this means include an initiating part proximate to the forward portion of the tongue 16 so that it is conveniently accessible to an operator on the tractor or other vehicle that is pulling the machine.

At this point, it should be noted that the working part or pickup attachment 32 is in transversely spaced relation to the rear end portion 20 of the tongue 16 and is also in fore-and-aft spaced relationship to the forward end or clevis end 18 of the tongue. Thus, the working part, or at least the pivot thereof at 34, is remote from the forward portion of the tongue in both fore-and-aft and transverse directions.

Adjustment of the working part or pickup attachment 32 about the pivot 34 is accomplished by adjusting means, designated generally by the numeral 68, best shown in Figs. 1 and 3. This adjusting means comprises a rockshaft 70 carried on the main frame 10 by means of rightand left-hand brackets 72 and 73 positioned at a forward under portion of the feeder house structure 46. Keyed or otherwise fixed to the rockshaft 70 are first or rightand left-hand arms or output members 74 and 75, and these are connected to the pickup attachment 32 by means of fore-and-aft extending links, only the left-hand one of which is visible at 77 in Fig. 1. It will thus be seen that rocking of the rockshaft 70 effects adjustment of the working part 32 about the pivot 34.

The rockshaft 70 includes at its left-hand end an input member or second arm 78 that is here embodied as a continuation of the arm 75. Hence, force applied to the arm 78 will cause rocking of the rockshaft 70 and consequent fore-and-aft movement of the adjusting arms 74 and 75. The input member or arm 78 is transversely spaced from the rear end portion 20 of the tongue 16 and, since it is at a rear portion of the main frame 10, it is likewise in fore-and-aft spaced relationship to the forward end 18 of the tongue.

A direction-changing means in the form of a second sheave 80 is journaled on the main frame 10 by means of a pivot shaft 82 and bracket 84. The mounting of the sheave is such that it is substantially in fore-and-aft alinement with the input member or arm 78. The sheaves 30 and 80 are, as best shown in Fig. 3, spaced apart transversely and substantially in transverse alinement.

The forward portion of the tongue 16, or at least a portion thereof intermediate the ends 18 and 20, carries forceexerting means designated generally by the numeral 86 in Figs. 1, 2 and 3. This means is a selectively expansible and contractible device and comprises a housing 88 having at one end thereof a clevis 90. An interior portion of the housing 88 carries an internally threaded bevel pinion 92 within which is threaded an elongated screw 94 having a clevis 96 at its forward end. A second bevel pinion 98 is in constant mesh with the pinion 92 and is keyed to an input shaft to which is fixed a crank 102. Rotation of the crank causes the screw member 94 to extend or retract relative to the housing 88. Thus, the force-exerting device comprises relatively movable members 88 and 94 and this relative movement is used to effect adjustment of the pickup attachment or working part 32, in a manner to be described immediately below.

The device 86 is connected by its clevis 90 and a pin 104 to an anchor bracket or member 106 rigid on an intermediate portion of the draft tongue 16. The forward clevis 96 of the screw member 94 is connected by a pin 108 to a movable force-transmitting member or arm 110 pivoted at 112 on a bracket 114 that is rigidly connected to an intermediate portion of the tongue 16 forwardly of the anchor member 106. Fore-and-aft movement of the arm or member 110 is guided by guide means in the form of an elongated strap 116. Rotation of the crank 102 causes fore-and-aft movement of the force-transmitting member 110 and this force or motion is transmitted to the input member or arm 78 on the rockshaft 70 by a flexible force-transmitting element or tensionable means, designated generally by the numeral 118.

The flexible force-transmitting means 118 includes a first or fore-and-aft extending tensionable portion in the form of a link or rod 120 which has at its forward end a clevis 122 connected by a pin 124 to a portion of the force-transmitting arm or member 110 intermediate the pivot 112 and clevis pin 108. The rear end of the rod or link 120 is in the form of an eye 126 and this eye is connected to one end of a flexible member in the form of a first chain 128 that is trained about the first sheave 30. The other end of the chain 128 is connected to a second tensionable portion or transverse link or rod 130, which rod has at its left-hand end an eye 132 for effecting the connection to the chain 128 and which rod has at its righthand end an eye 134 for effecting a connection with a second flexible member or chain 136 that is trained about the second sheave 80. A third rod or link 138 has a rear end in the form of an eye 140 connected to the other end of the chain 136 and has at its forward end a clevis 142 that is connected by a pin 144 to the upper end of the input arm 78. The chain 136, extending rearwardly and being trained about the sheave 80 to extend to the right for connection at 134 to the link 130, may be considered as an extension of the input member 78 so as to afford an input member connection portion in substantial transverse alinement with the sheave 30. An assist or counterbalancing spring 146 is connected between the main frame 10 and the input arm 78 and operates in parallel with the forces transmitted through the flexible element 118 by the device 86.

One characteristic of the control and adjusting means is that the parts are all substantially at the same horizontal level, which is approximately the level of the frame parts or axle and tongue 12 and 16, and therefore there are no vertically projecting parts to interfere with the operation of the machine or to detract from the appearance of the machine. The force-transmitting element 118 runs alongside the tongue 16 and thence along or in front of the axle 12. The connection effected by the rod 138 and the fore-and-aft portion of the chain 36 is proximate to the feeder house 46. The coaxial arrangement of the sheave 30 and the pivotal mounting of the rear end of the tongue 16 at the pivot 28 is such that lateral adjustment of the tongue 16 does not in any way interfere with the force-transmitting element 118. The operation of the device 86 is such that longitudinal forces are exerted parallel to the tongue 16, thus utilizing the tongue as means for spacing the device 86 from the sheave 30.

Therefore, additional bracing structure is not required. The same is true as respects the relationship between the transverse portion 130 of the means 118 and the axle 12.

Another feature of the invention is the removability of the device 86 so that another device may be substituted therefor if desired. A representative replacement device of the expansible-contractible type is shown in Fig. 5 and is identified generally by the numeral 148. This device comprises a hydraulic cylinder 150 in which is a piston (not shown) having a piston rod 152 provided with a clevis 154 for connection to the anchor member 106 as by the pin 104 that was previously used to connect the rear end of the device 86. The forward end of the cylinder 150 has a clevis 156 that is connectible to the force-transmitting arm 110 as by the pin 108 previously used at the front end of the device 86. Fluid is supplied to the device 148 by means of a pair of fluid-transmitting hoses 158 and 160. The device 148 is a conventional type of fluid motor known as a remote cylinder and illustrated particularly in the U. S. patent to Jirsa et al. 2,532,552. It will be obvious, of course, that any other type of device could be used in place of the devices 86 and 148, those shown being representative of that feature of the invention that permits the interchangeability of devices between the members 106 and 110 without entailing structural alterations.

Other features and characteristics of the invention, not specifically enumerated herein, will undoubtedly occur to those versed in the art, as will modifications and alterations in the preferred embodiment of the invention disclosed, all of which may be achieved without departing from the spirit and scope of the invention.

What is claimed is:

1. An agricultural machine of the character described, comprising: a mobile main frame; a draft tongue having front and rear ends and secured at its rear end to the main frame to project forwardly thereof; an agricultural working part positioned ahead of the main frame and alongside of the tongue; means mounting the working part on the main frame for vertical adjustment relative to said frame and relative to the tongue; a rockshaft on the main frame and having first and second arms fixed thereto in laterally offset relationship to the rear end of the draft tongue, means interconnecting the first arm and the working part so that rocking of the rockshaft effects adjustment of the working part; a first sheave carried by the main frame adjacent to the rear end of the draft tongue; a second sheave carried by the main frame adjacent to the second arm on the rockshaft; force-exerting means carried by the draft tongue forwardly of the first sheave and including a movable force-transmitting member; and a flexible force-transmitting element having one end connected to said member, extending rearwardly and about the first sheave, laterally and about the second sheave and thence forwardly and having its opposite end connected to the second arm on the rockshaft.

2. The invention defined in claim 1, in which: the rear end of the draft tongue is secured to the main frame by pivot means enabling adjustment of the tongue relative to the frame; and said first sheave is mounted on the main frame on a journal axis proximate to said pivot means so that adjustment of the tongue is free from interference with and by adjustment of the agricultural working part.

3. The invention defined in claim 2, in which: the pivot means includes a vertical pivot axis so that adjustment of the tongue is laterally of the frame; and the journal axis of the first sheave is coincident with said pivot axis.

4. The invention defined in claim 1, in which: the flexible element includes first and second chains trained respectively about the first and second sheaves, a first link extending between the force-transmitting member and the first chain, a second link between and interconnecting the chains, and a third link connecting the second chain to the second arm on the rockshaft.

5. An agricultural machine of the character described, comprising: a mobile main frame; a draft tongue having front and rear ends and secured at its rear end to the main frame to project forwardly thereof; an agricultural working part positioned ahead of the main frame and alongside of the tongue; means mounting the working part on the main frame for vertical adjustment relative to said frame and relative to the tongue; a rockshaft on the main frame and having first and second arms fixed thereto in laterally offset relationship to the rear end of the draft tongue, means interconnecting the first arm and the working part so that rocking of the rockshaft effects adjustment of the working part; a first sheave carried by the main frame adjacent to the rear end of the draft tongue; a second sheave carried by the main frame adjacent to the second arm on the rockshaft; an anchor member secured to the tongue forwardly of the rear end of the tongue; a force-transmitting member spaced from the anchor member lengthwise of and mounted on the tongue for fore-and-aft movement relative to the tongue; force-exerting means including relatively movable elements connected respectively to the anchor and force-transmitting members; and a flexible force-transmitting element having one end connected to said member, extending rearwardly and about the first sheave, laterally and about the second sheave and thence forwardly and having its opposite end connected to the second arm on the rockshaft.

6. An agricultural machine of the character described, comprising: a mobile main frame; a draft tongue having front and rear ends and secured at its rear end to the main frame to project forwardly thereof; an agricultural working part positioned ahead of the main frame and alongside of the tongue; means mounting the working part on the main frame for vertical adjustment relative to said frame and relative to the tongue; adjusting means movably carried on the main frame adjacent to the working part and including an output member connected to said part and further including an input member; first guide means carried by the main frame proximate to the rear end of the draft tongue; second guide means carried by the main frame proximate to the input member; force-exerting means carried by the draft tongue forwardly of the first guide means and including a movable force-transmitting member; and a flexible force-transmitting element having one end connected to said member, extending rearwardly and about the first guide means, laterally and about the second guide means and thence forwardly and having its opposite end connected to the aforesaid input member.

7. An agricultural machine of the character described, comprising: a mobile main frame; a draft tongue having front and rear ends and secured at its rear end to the main frame to project forwardly thereof; an agricultural working part positioned ahead of the main frame and alongside of the tongue; means mounting the working part on the main frame for vertical adjustment relative to said frame and relative to the tongue; adjusting means movably carried on the main frame adjacent to the working part and including an output member connected to said part and further including an input part; force-exerting means carried by the draft tongue ahead of the rear end of said tongue and including a fore-and-aft movable force-transmitting member; a first, fore-and-aft force-transmitting link having a front end connected to said member and extending rearwardly therefrom to a rear end in proximity to the rear end of the draft tongue; a second, transverse link extending from a first end adjacent to the rear end of the first link; a third, fore-and-aft link having a rear end in proximity to the second end of the second link; first direction-changing means carried on the main frame adjacent to and interconnecting the proximate ends of said first and second links to convert fore-and-aft motion of the first link to transverse motion of the second link; and second direction-changing means carried by the main frame adjacent to and interconnecting the proximate ends of the second and third links for converting transverse motion of the second link to fore-and-aft motion of the third link.

8. An agricultural machine of the character described, comprising: a main frame adapted to advance over a field; a first frame part secured to the main frame and extending fore-and-aft; a second frame part spaced transversely from the first frame part; means mounting the second frame part on the main frame for adjustment relative to said main frame and first frame part; adjusting means on the main frame adjacent to the second frame part and having an output member connected to the second frame part and further having an input member including a connection portion spaced transversely from the first frame part; force-exerting means carried by the first frame part and including a movable force-transmitting member spaced both transversely and fore-and-aft from the input member connection portion; and force-transmitting means interconnecting the force-transmitting member and the input member connection portion and including a sheave spaced transversely from the input member connection portion and in substantial fore-and-aft alinement with the force-transmitting member and a flexible element trained about the sheave and having a transverse portion connected to the input member and a fore-and-aft portion connected to the force-transmitting member.

9. An agricultural machine of the character described, comprising: a main frame adapted to advance over a field; a first frame part extending fore-and-aft and connected to the main frame for lateral swinging about an upright axis; a second frame part connected to the main frame for adjustment relative to said main frame and first frame part; adjusting means on the main frame adjacent to the second frame part and having an output member connected to the second frame part and further having an input member spaced transversely from the aforesaid axis; force-exerting means carried by the first frame part and including a movable force-transmitting member spaced fore-and-aft from the aforesaid axis; and force-transmitting means interconnecting the force-transmitting and input members and including a sheave substantially coaxial with said axis and a flexible element trained about the sheave and having a transverse portion connected to the input member and a fore-and-aft portion connected to the force-transmitting member.

10. An agricultural machine of the character described, comprising: a mobile main frame including a horizontal transverse frame part and a horizontal fore-and-aft frame part generally at the level of the transverse part; an agricultural working part carried by the main frame in transversely spaced relation to the fore-and-aft frame part and for adjustment relative to said main frame; and adjusting means carried by the main frame and connected to the working part for adjusting said working part, said means including an input member generally at the level of the frame parts; force-exerting means carried by and at the level of the fore-and-aft frame part including a movable force-transmitting member in fore-and-aft spaced relation to the transverse frame part and in transversely spaced relation to the aforesaid input member, an anchor member fixed to the fore-and-aft frame part in spaced relation to the movable force-transmitting members, and a selectively expansible and contractible device interconnected between said members for moving the movable member selectively in opposite directions; and force-transmitting means having a fore-and-aft tensionable portion connected to the movable force-transmitting member and running along and at the level of the fore-and-aft frame part and a transverse tensionable portion connected to the input member and running along and at the level of the transverse frame part.

11. An agricultural machine of the character described, comprising: a mobile main frame; a draft tongue having front and rear ends and arranged with its rear end proximate to the main frame so that the tongue extends forwardly from the main frame; means mounting the rear end of the draft tongue on the main frame for swinging of the tongue relative to the main frame about a pivot axis; an agricultural working part positioned ahead of the main frame and alongside of the tongue; means mounting the working part on the main frame for vertical adjustment relative to the frame and relative to the tongue; adjusting means movably carried on the main frame adjacent to the working part and including an output member connected to said part and further including an input part; force-exerting means carried by the draft tongue intermediate the ends thereof and having a movable force-transmitting member; a sheave carried by the main frame on a journal axis proximate to the aforesaid pivot axis; and a flexible force-transmitting element having opposite ends connected respectively to the input and force-transmitting members and having its intermediate portion trained about said sheave.

12. The invention defined in claim 11, in which: the pivot means includes a vertical pivot axis so that adjustment of the tongue is laterally of the frame; and the journal axis of the sheave is coincident with said pivot axis.

13. An agricultural machine of the character described, comprising: a mobile main frame; a draft tongue having front and rear ends and secured at its rear end to the main frame to project forwardly thereof; an agricultural working part positioned ahead of the main frame and alongside of the tongue; means mounting the working part on the main frame for vertical adjustment relative to said frame and relative to the tongue; an adjusting member connected to the working part and movable to adjust said part, an anchor member secured to the tongue forwardly of the rear end of the tongue independently of the main frame; a force-transmitting member spaced from the anchor member lengthwise of and mounted on the tongue independently of the main frame for fore-and-aft movement relative to the tongue; means interconnecting the force-transmitting member to the adjusting member for movement of the two in unison; and detachable force-exerting means including relatively movable elements removably connected respectively to the anchor and force-transmitting members.

References Cited in the file of this patent
UNITED STATES PATENTS

| | | |
|---|---|---|
| 1,728,150 | Christiansen | Sept. 10, 1929 |
| 1,819,605 | Johnston | Aug. 18, 1931 |
| 2,253,633 | Lindly | Aug. 26, 1941 |
| 2,266,805 | Ronning | Dec. 23, 1941 |
| 2,630,667 | Krause | Mar. 10, 1953 |
| 2,651,162 | Whisler | Sept. 8, 1953 |
| 2,699,031 | MacDonald | Jan. 11, 1955 |